J. C. RICHARDSON, OF ILION, NEW YORK.

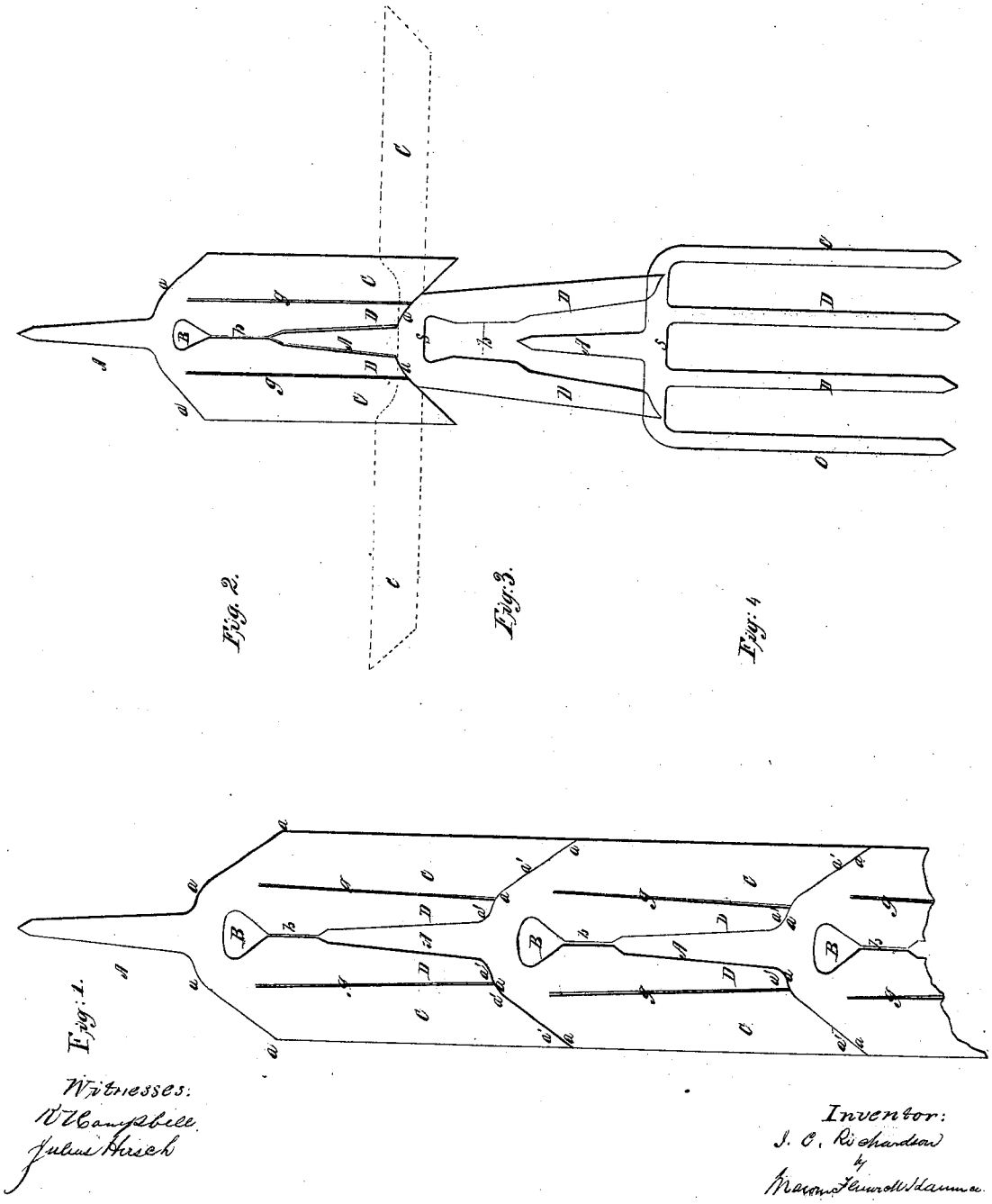

Letters Patent No. 85,400, dated December 29, 1868.

IMPROVEMENT IN FORK-BLANK.

The Schedule referred to in these Letters Patent and making part of the same.

*To all whom it may concern:*

Be it known that I, J. C. RICHARDSON, of Ilion, in the county of Herkimer, and State of New York, have invented an Improvement in Fork-Blank; and I do hereby declare that the following is a full, clear, and exact description of the blank and my improvement, reference being had to the accompanying drawings, making part of this specification, in which—

Figure 1 shows the form of the improved blanks, and the method of cutting or stamping them from a metal plate.

Figures 2, 3, and 4, show the three successive stages of the manufacture to produce a fork.

Similar letters of reference indicate corresponding parts in the several figures.

This invention relates to an improvement of the fork-blank, patented to me, November 24, 1868, and consists in producing blanks from plates of proper thickness, by stamping, or otherwise cutting, so as to form a space in each blank, with a slit leading from it to the point of a shank of the succeeding blank, said space being made in the middle of the width of the blank, and at a proper point to form a square crotch or shoulder between the middle tines, when the latter are spread out and finished, and said space being formed by cutting out and disconnecting a piece from the blank, as will be hereinafter described.

To enable others skilled in the art to understand my invention, I will describe its construction and operation.

In the accompanying drawings, fig. 1, I have represented two of the improved fork-blanks as they would appear when put together in the manner of producing them from a sheet of metal.

It will be seen that the contour of the foot or lower edge $a'$ of a blank, is exactly the shape of the upper edge or head, $a$, and shank A of the blank. Thus, in cutting or stamping one blank, I produce in the "stock" the shape of the head and shank of another blank.

This feature, broadly considered, is not new, as fork-blanks have been made in this way, before the invention which forms the subject of this patent.

My object is to adopt the above-described feature of having the heads and lower ends of fork-blanks of the same configuration, and, at the same time, to provide for producing a sharp-pointed or finished shank, A, of any required length, in the act of cutting or stamping a blank from the "stock."

To do this, I form in each blank a space, B, with a cut or slit, $g$, extending from it to the point of the shank A of the succeeding blank, as shown in fig. 1, so that the two intermediate prongs D D of the blank can be spread apart, as shown in fig. 3, and the square shoulder, $s$, produced.

The space B is produced by cutting out and disconnecting a piece of metal from the stock, of the same shape as this space, and the space which is formed between the prongs D D, below the lower termination of the slit $b$, corresponds in shape and size to the shank A of a fork-blank.

The two cuts or slits $g$ $g$ are intended to separate the prongs C C from the prongs D D, so that the former can be spread out, as indicated by the red lines in fig. 3, for the purpose of drawing and reducing them to their final shape, shown in fig. 4.

By thus cutting out and disconnecting from each blank a piece of the stock to form the space B, and slitting the blank as at $b$, to separate the prongs D D up to this space B, I am enabled to produce a pointed shank A on each blank, and I am also enabled to make the shank longer or shorter, as may be desired.

I do not desire to be understood as making a broad claim under the patent to the formation of the square shoulder or crotch between the middle tines, by cutting out a piece of the metal, and leaving it upon the end of the tang of the succeeding blank, as described in an application made by me previous to this, and I hereby restrict my claim to the cutting and slitting-process, which enables me to produce the shoulders $s$, and, at the same time, the pointed and finished shank A.

Having described my invention,

What I claim as new, and desire to secure by Letters Patent, is—

Cutting out the shank A, and connecting the space caused by the removal of said shank, with the space caused by the removal of another portion of the metal, by the slit $b$, as described.

J. C. RICHARDSON.

Witnesses:
F. H. McMURRAY.
I. I. FOLTS.